US010532892B2

(12) United States Patent
Knobloch

(10) Patent No.: US 10,532,892 B2
(45) Date of Patent: Jan. 14, 2020

(54) TRANSPORT DEVICE FOR THE ROW-BY-ROW RELOCATION OF PIECE GOODS THAT ARE PRONE TO FALLING OVER

(71) Applicant: AUTEFA SOLUTIONS GERMANY GMBH, Friedberg (DE)

(72) Inventor: Peter Knobloch, Gersthofen (DE)

(73) Assignee: AUTEFA SOLUTIONS GERMANY GMBH, Friedberg (DE)

( * ) Notice: Subject to any disclaimer, the term of this patent is extended or adjusted under 35 U.S.C. 154(b) by 0 days.

(21) Appl. No.: 16/083,217

(22) PCT Filed: Mar. 7, 2017

(86) PCT No.: PCT/EP2017/055311
§ 371 (c)(1),
(2) Date: Sep. 7, 2018

(87) PCT Pub. No.: WO2017/153401
PCT Pub. Date: Sep. 14, 2017

(65) Prior Publication Data
US 2019/0077609 A1    Mar. 14, 2019

(30) Foreign Application Priority Data

Mar. 7, 2016  (DE) .................... 20 2016 101 207 U

(51) Int. Cl.
*B65G 47/08* (2006.01)
*B65G 47/82* (2006.01)
*B65B 35/36* (2006.01)

(52) U.S. Cl.
CPC ............ *B65G 47/088* (2013.01); *B65B 35/36* (2013.01); *B65G 47/82* (2013.01); *B65G 2201/0244* (2013.01)

(58) Field of Classification Search
CPC ...... B65G 47/082; B65G 47/82; B65G 47/08; B65B 21/06; B65B 35/44
(Continued)

(56) References Cited

U.S. PATENT DOCUMENTS 1,902,326 A * 3/1933 Geer ....................... C03B 25/06
                                                    198/432
1,906,605 A * 5/1933 Hutchinson ............. C03B 35/08
                                                    198/430
(Continued)

FOREIGN PATENT DOCUMENTS

DE       42 16 671 A1    9/1993
DE       295 07 589 U1   7/1995
(Continued)

*Primary Examiner* — James R Bidwell
(74) *Attorney, Agent, or Firm* — McGlew and Tuttle, P.C.

(57) ABSTRACT

A relocation method for moving piece goods and an associated transport device are provided. The piece goods (2), that are prone to falling over, in particular bottles, are moved between an in-flow region (E) and a holding area (9) for a layer (10) formed of adjacent rows (3, 4, 5) of the piece goods (2). A transport device (1) has multiple relocation guides (11-15) which are moveable in a controlled manner, and which are configured to transport a row (3-7) or a set of rows of the piece goods between the inflow region (E) and the holding area, to assemble or disassemble a layer. A respective second-outermost row (K2) or a second-outermost set of rows of the layer are secured against falling over by means of a relocation guide (11). An outermost row (K1) or an outermost set of rows is added to the layer or removed from the layer.

20 Claims, 4 Drawing Sheets

(58) Field of Classification Search
USPC .................................. 198/429, 430, 432, 433
See application file for complete search history.

(56) References Cited

U.S. PATENT DOCUMENTS

| | | | | |
|---|---|---|---|---|
| 1,998,163 | A * | 4/1935 | Meyer | C03B 35/10 198/429 |
| 2,094,497 | A * | 9/1937 | Ross | C03B 35/10 198/430 |
| 3,388,815 | A * | 6/1968 | Lingl | B65G 49/08 198/411 |
| 4,548,313 | A * | 10/1985 | Occhialini | B65G 47/82 198/430 |
| 7,220,094 | B2 * | 5/2007 | Cerutti | B65B 23/14 198/430 |
| 2007/0256909 | A1 | 11/2007 | Shimomae et al. | |
| 2016/0362259 | A1 * | 12/2016 | Papsdorf | B65B 35/44 |

FOREIGN PATENT DOCUMENTS

| | | |
|---|---|---|
| EP | 2 16 1 226 A1 | 3/2010 |
| EP | 2 500 296 A1 | 9/2012 |
| JP | 2006 137456 A | 6/2006 |
| JP | 3 974409 B2 | 9/2007 |
| JP | 2010006555 A | 1/2010 |
| WO | 2004/000649 A1 | 12/2003 |
| WO | 2014/181733 A1 | 11/2014 |

\* cited by examiner

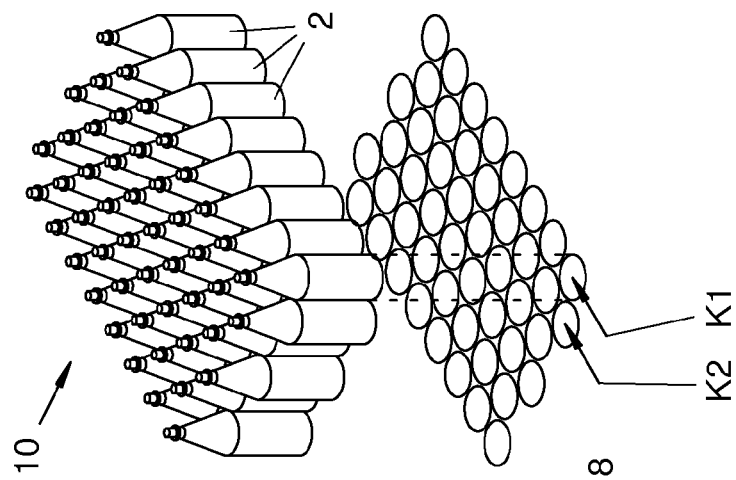
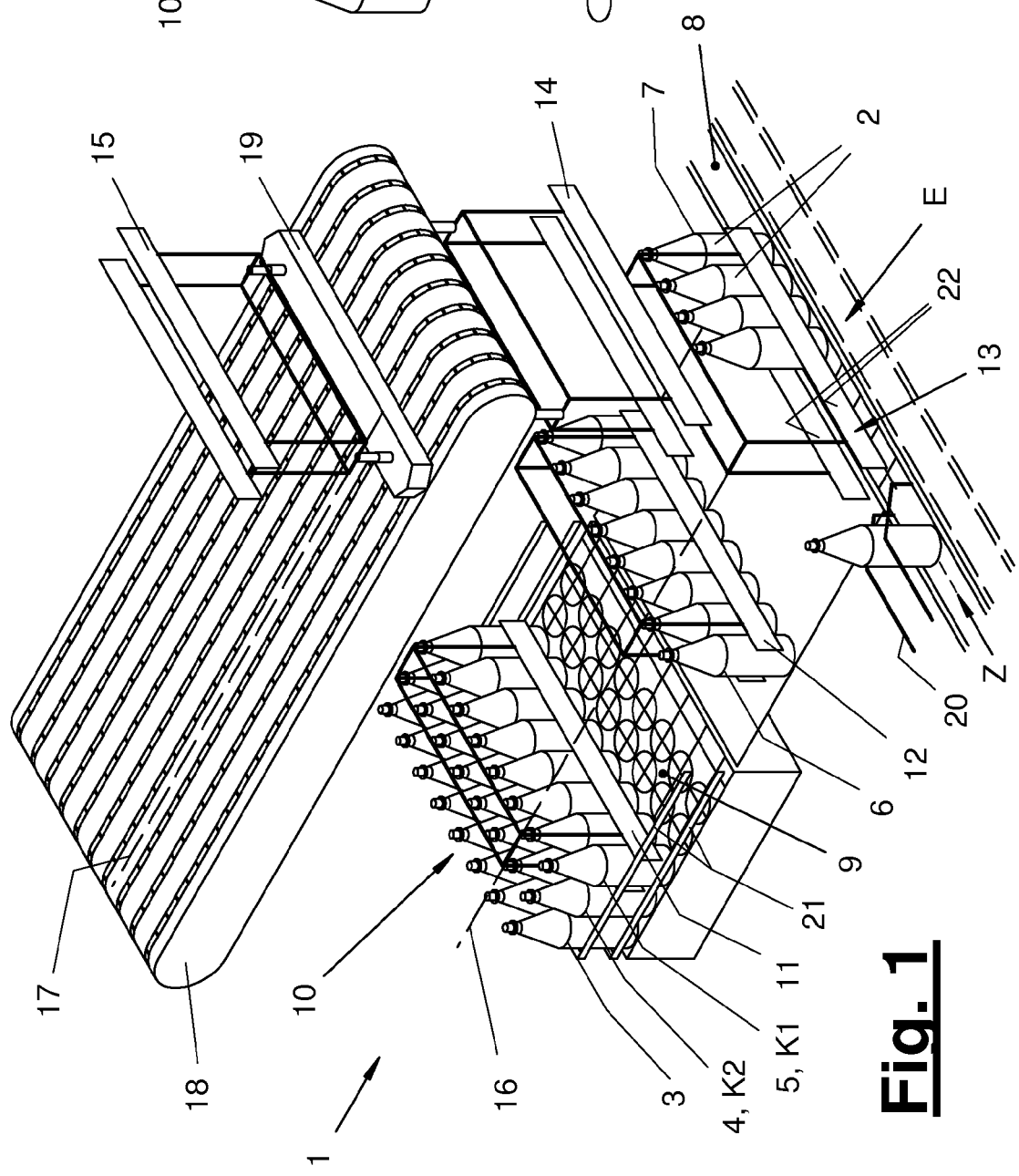

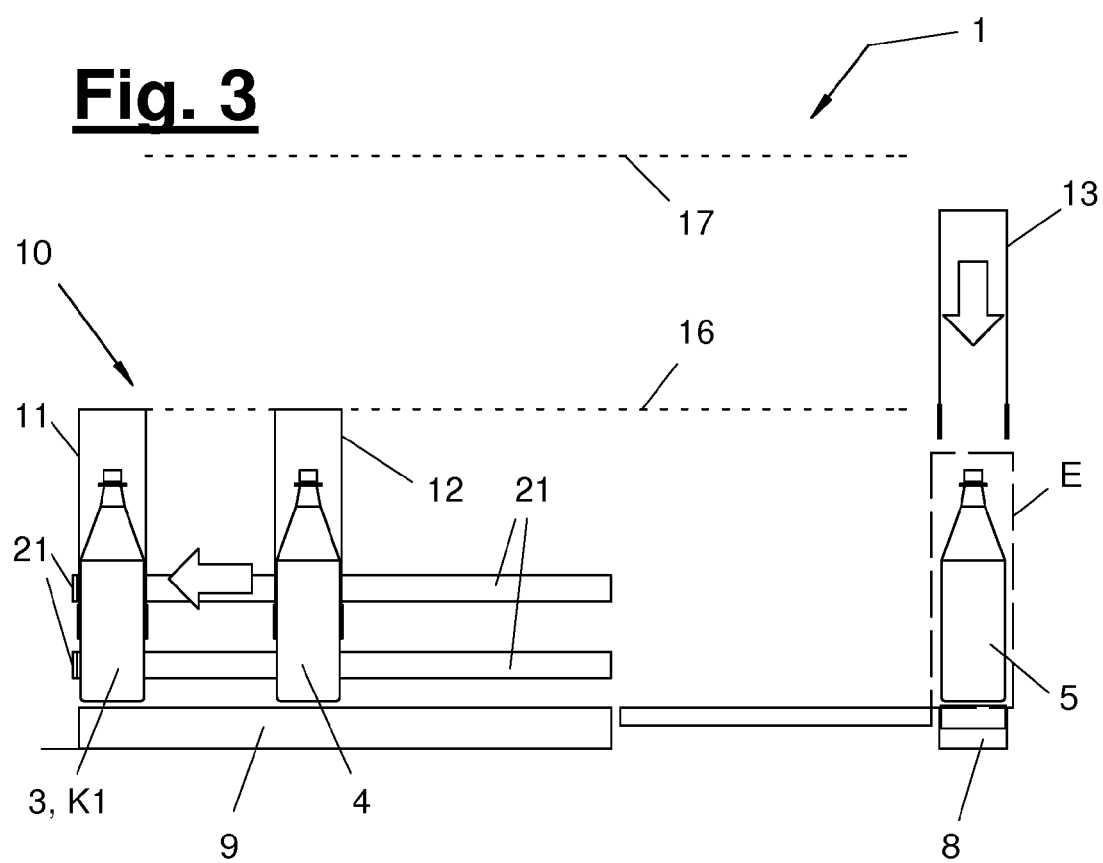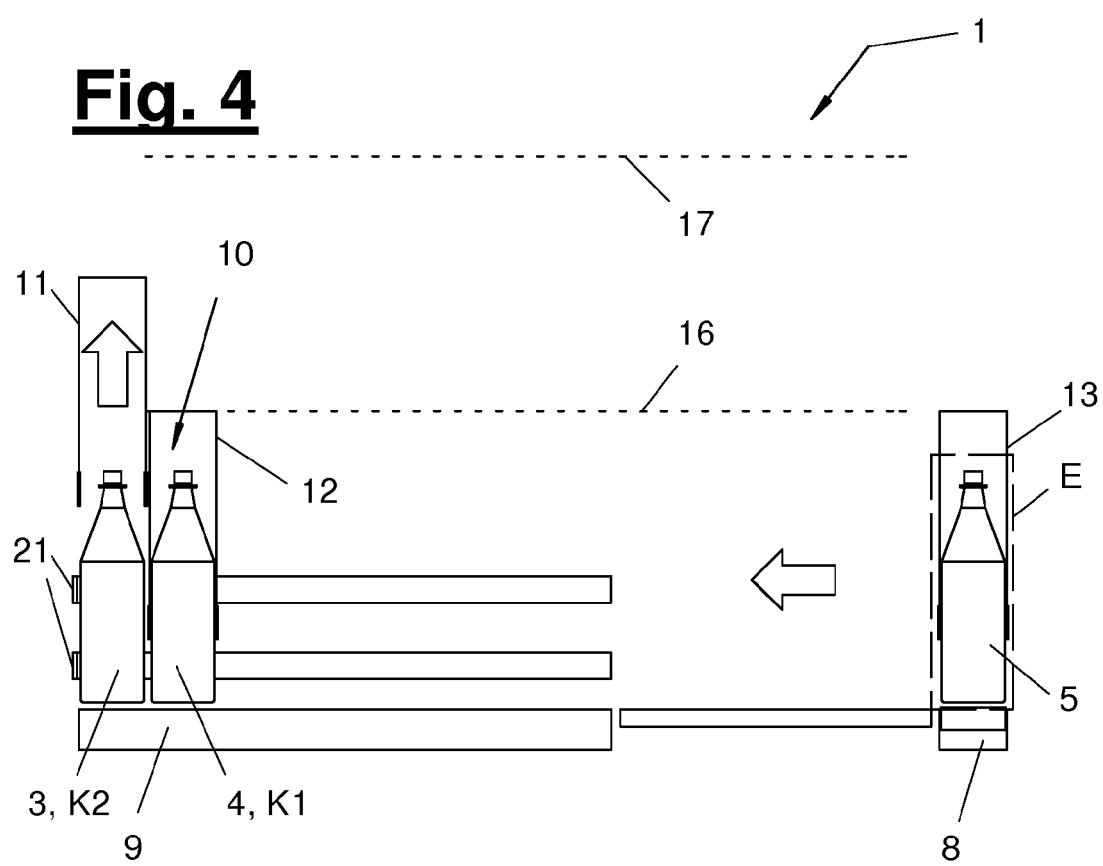

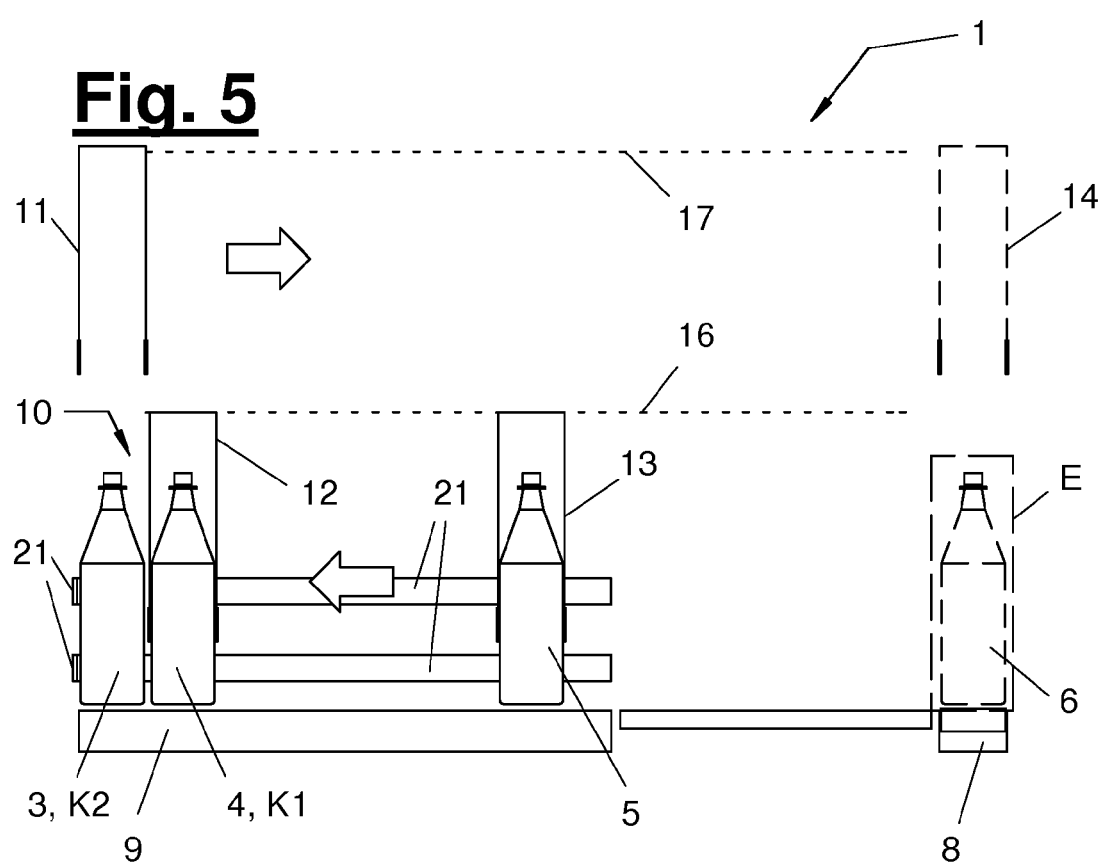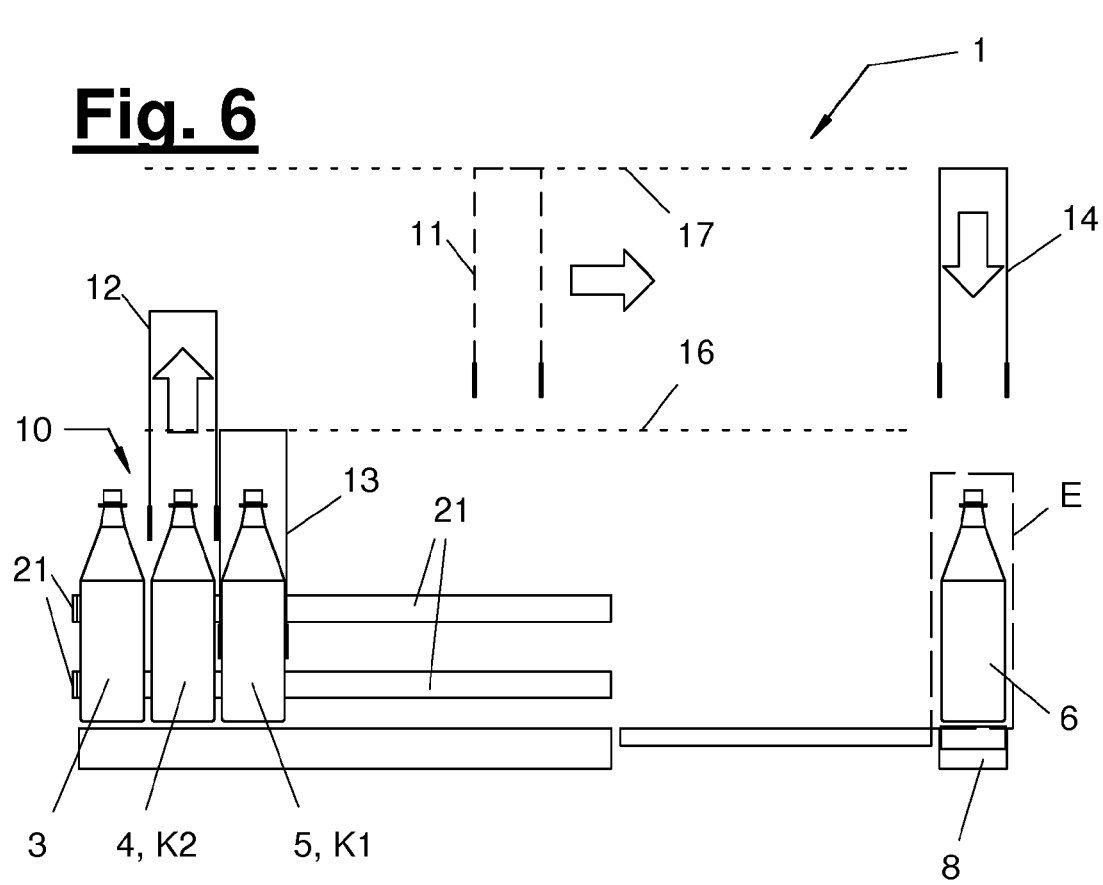

TRANSPORT DEVICE FOR THE ROW-BY-ROW RELOCATION OF PIECE GOODS THAT ARE PRONE TO FALLING OVER

CROSS REFERENCE TO RELATED APPLICATIONS

This application is a United States National Phase Application of International Application PCT/EP2017/055311, filed Mar. 7, 2017, and claims the benefit of priority under 35 U.S.C. § 119 of German Application 20 2016 101 207.4, filed Mar. 7, 2016, the entire contents of which are incorporated herein by reference.

TECHNICAL FIELD

The present invention pertains to a transport device for the row-by-row relocation of piece goods, i.e., for the joint relocation of a plurality of such piece goods, which are arranged in a row or in a set of rows.

BACKGROUND

Piece goods prone to falling over are bodies to be transported that have a high center of gravity in relation to their base and are therefore prone to falling over easily. Examples of piece goods prone to falling over are bottles standing upright, especially PET bottles, HDPE bottles and similar plastic bottles, pipes standing upright, etc.

The transport device is preferably arranged at a piece goods-producing plant, a packaging or bottling plant or is integrated in same. The piece goods may be transported over a goods aisle having any desired configuration between the transport device and other parts of the plant.

The transport device comprises a plurality of relocation guides, with which rows of the piece goods are moved between an inflow area, especially a row-forming area or a row-disassembling area at a goods aisle, and a holding area. A so-called layer of a plurality of rows of piece goods is assembled or a layer arranged at the holding area is disassembled by removing rows. The addition or removal of the rows at the layer is carried out by the transport device and by a movement of the relocation guides.

SUMMARY OF THE INVENTION

The prior-art transport devices of this type do not have an optimal configuration. The object of the present invention is to show an improved transportation technology, with which it is possible, in particular, to expedite the assembly or disassembly of layers and/or to better avoid the falling over of the piece goods. The transport technology comprises a transport device and a relocation process.

The transportation technology according to the present invention with its advantages will be described below. Unless a distinction is explicitly made, the disclosed features may be features of the transport device as well as of the relocation process individually or in combination. The relocation process may be carried out by the disclosed transport device or by another suitable device.

The transport device according to the present disclosure has a plurality of relocation guides movable in a controlled manner, which are configured to pick up a row or a set of rows of piece goods and to move them between an inflow area, especially at a goods aisle, and a layer holding area. The relocation guides may preferably be moved in a separately controlled manner. In particular, the triggering time for the start of a movement and the width of the movement may be preset separately for each relocation guide.

The piece goods may preferably flow in and out in an essentially horizontal direction of movement at the inflow area. When flowing in or flowing out, the direction of movement of the piece goods is preferably at right angles to the direction in which the piece goods are moved as a row or as a set or rows to or from the layer holding area. In other words, the flowing-in and flowing-out directions as well as a relocation direction are preferably in a common and essentially horizontal plane. Another direction reference may be selected as an alternative. When assembling a layer, a row of piece goods is picked up by a relocation guide at the goods aisle and moved to the holding area in order to open a new layer there or to add the row as a new outermost row to an existing layer. When disassembling a layer, an outermost row is correspondingly removed in the reverse order from the layer and moved to the goods aisle. The outermost row is the outermost row on the side of the layer pointing towards the goods aisle. As an alternative to a single row, a set of rows comprising two or more rows may be moved as a block. Further, mixed forms are possible, i.e., single rows and sets of rows may be moved alternatingly.

The transport device according to the present invention is configured to secure a second-outermost row or a second-outermost set of rows of the layer against falling over by means of a relocation guide when assembling a row or disassembling a row while an outermost row or an outermost set of rows is being added or removed.

When assembling a layer, a first relocation guide is left at a row of the layer that was just added or at a set of rows of the layer that was just added until another relocation guide has added the next row or the next set of rows to the layer. Since the first relocation guide is left at the added layer and is only removed when the next row has been added, falling over of all the rows arranged in the layer is effectively avoided at any time while the layer is being assembled, since the first relocation guide supports at the same time the additional rows in the layer next to the outermost row and to the second-outermost row.

As an alternative or in addition, an additional relocation guide is moved during the disassembly of the layer to the second-outermost row or to a second outermost set of rows of the layer and is held there before a first relocation guide removes the outermost row or the outermost set of rows of the layer. When the first relocation guide is moved away from the layer, the layer being held by the additional relocation guide becomes the outermost layer and is effectively secured against falling over by the additional relocation guide.

Due to the second-outermost row or the second-outermost set of rows in the layer being secured during the addition or removal of an outermost layer, the relocation operation is carried out with a markedly increased security against the piece goods falling over. The relocation guides may be moved at any desired velocity and it is not necessary to ensure that air blasts or swirling, which could lead to the piece goods of the second-outermost layer falling over, are avoided. The layer can thus be assembled and disassembled at high speeds.

The present invention is schematically shown as an example in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic oblique view of a transport device according to the disclosure;

FIG. 2 is an oblique view of a layer of piece goods with rows offset in relation to one another;

FIG. 3 is a side view showing aspects of a procedure according to the disclosure for relocating rows for assembling a layer;

FIG. 4 is a side view showing aspects of a procedure according to the disclosure for relocating rows for assembling a layer;

FIG. 5 is a side view showing aspects of a procedure according to the disclosure for relocating rows for assembling a layer;

FIG. 6 is a side view showing aspects of a procedure according to the disclosure for relocating rows for assembling a layer.

DESCRIPTION OF PREFERRED EMBODIMENTS

Figure 7:
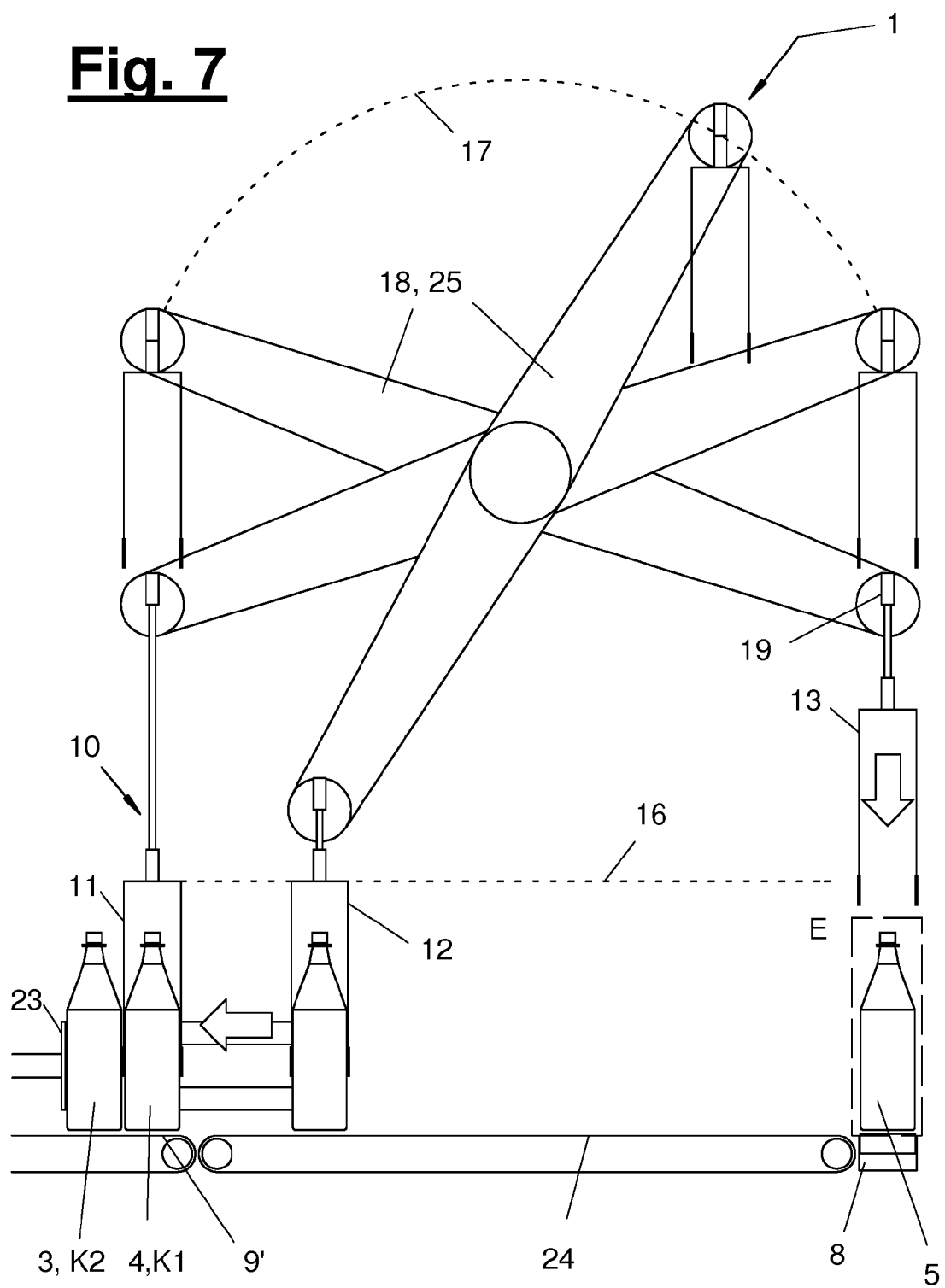
FIG. 7 is an alternative embodiment variant of a transport device.

Referring to the drawings, FIG. 1 shows a transport device (1) comprising a plurality of relocation guides (11-15). The relocation guides (11-15) may have any desired configuration. In the example shown, each relocation guide (11-15) has two holding strips (22), which are located at spaced locations from one another and support a row (3-7) of piece goods (2) at least on the longitudinal sides. The holding strips (22) are arranged in the example shown on a downwardly open carrying cage or carrying frame. Movement of the carrying cage leads to a corresponding movement of the holding strips (22), as a result of which one or more rows (3-7) picked up between the holding strips are moved.

According to the embodiment variant shown in FIG. 1, a relocation guide (11-15) can be lowered in the vertical direction, i.e., from top to bottom, to above a row (3-7) of piece goods (2), i.e., it can be fed into the guiding position relative to the row (3-7). The respective relocation guide (11-15) can again be removed from the respective row (3-7) in the opposite direction or in another suitable direction. The feed movements for moving a relocation guide (11-15) to and from a row (3-7) preferably take place parallel to one another and in opposite directions.

According to an alternative embodiment (not shown), a relocation guide may have an open end face and moved along the longitudinal direction of a row (3-7) over a row (3-7) essentially in a horizontal direction and again pulled off from the row in the reverse direction or in the same direction.

In the example according to FIG. 1, the transport device (1) is arranged at a piece goods-producing plant in the form of a blowing plant for producing containers, especially plastic bottles. As an alternative, the transport device may be arranged at a bottling plant for bottles, etc. The containers or bottles are guided along a goods aisle (8) to the transport device and enter the inflow area (E) of the transport device (1). The inflow area may be, in addition or as an alternative, an outflow area (during the disassembly of a layer) or a transit area. It may cover one or more tracks of the goods aisle (8), which preferably extend adjacent to one another.

The goods aisle (8) may have any desired construction. In the example shown, the bottles (2) are moved along an essentially linear feed direction (Z) through a conveyor belt. The bottles (2) may be secured against falling over on the conveyor belt, for example, by a railing inflow (20). The bottles (2) are preferably supported by the holding strips of a relocation guide (13) in the inflow area (E) of the transport device (1), which area overlaps with the goods aisle (8). As an alternative or in addition, railings or other supporting devices, with which the piece goods (2) are prevented from falling over, may likewise be provided at the inflow area (E). These supporting devices may be especially movable and able to be removed from time to time at least on the side of the inflow area (E) pointing towards the holding area when a row (7) is being moved from the inflow area (E) in the direction of the holding area (9).

A row (7) of bottles (2) may preferably be formed within a relocation guide (13) positioned above the goods aisle (8), i.e., in the inflow area (E). A possibly movable end stop, against which the bottles (2) flowing in are supported in the longitudinal direction of the row (7) (stop not shown), may be provided at the relocation guide (13) and/or in the area of the goods aisle (8). As an alternative, any other device may be provided for forming or disassembling rows.

A fully formed row (7) is moved by a relocation guide (13) at right angles to the longitudinal direction of the row (7) and is transported to a holding area (9) for a layer (10) of piece goods (2). The holding area (9) is arranged essentially at right angles to the longitudinal direction of the row (7). Instead of a single row (7), a set of rows, which comprises, for example, two or three rows formed next to each other, and which had been formed on two or three tracks of the goods aisle (8), may be moved by a relocation guide (13). The movement of a row (7) or of a set of rows from the goods aisle (8) to the holding area (9) will hereinafter be called relocation.

Two or more of the rows (3-7) are arranged next to each other in the holding area (9) in order to assemble a layer (10). As an alternative, an existing layer (10) may be disassembled by removing a single row (3-7) or a set of rows. A removed row (3-7) is moved in such a case by the movement of a relocation guide (11-15) from the holding area (9) to the inflow area (E), especially to the goods aisle (8).

In the example according to FIG. 1, the second row (4) in the layer (10) presently forms the second-outermost row (K2) and a third row (5) presently forms the outermost row (K1). A fourth row (6) is moved by a relocation guide (12) to the holding area (9), i.e., relocated, and shall be added on to the layer (10). As soon as the fourth row (6) has been placed next to the third row (5), the fourth row (6) forms the outermost row (K1) and the third row (5) becomes the second-outermost row (K2).

The problem arose in prior-art transport devices for the row-by-row relocation of piece goods (2) prone to falling over that one or more units of the piece goods of a row (5, K1) just added could fall over before or during the addition of a next row (6). The transport device had to be stopped in such a case in order to upright the fallen-over piece goods manually and to set them up in the layer (10) in the intended position, which could lead to further compromise of the function of the upstream parts of the plant or made it necessary to provide a buffer zone in front of the inflow area (E).

All piece goods (2) in the layer (10) as well as in the moved rows (6, 7) are effectively prevented from falling over at any time by the transport device according to the present disclosure and especially by the disclosed relocation process and the disclosed relocation operation, in which a second-outermost row (K2) of the layer (10) is secured against falling over by means of a relocation guide (11), while an outermost row (10) is being added at the layer (10) or is being removed from the layer (10). Thus, steady monitoring of the transport device is not necessary during the operation and a buffer zone in front of the inflow area (E) may possibly be eliminated. Further, the speed of relocation of the relocation guides (11-15) can be increased and very high accelerations of the relocation guides can be used at the beginning and at the end of a relocating movement, which may also produce more intense swirling of the air or suction currents, without risking falling over of the piece goods (2) in the layer (10).

The holding area (9) for forming layers may have any desired configuration. According to a preferred embodiment variant, a layer carrier, tray or tray bottom (without reference number), for example, a pallet, on which one or more layers (10) of piece goods (2) are assembled, is arranged in the holding area (9). A lifting device or handling device may correspondingly be provided in the area of the holding area (9) in order to arrange the carrier or carrying bottom relative to the goods aisle (8) such that the rows (3-7) can be moved by the relocation guides (3-7) preferably by a relocating movement oriented at right angles to the longitudinal direction of the rows (3-7). As an alternative, manual feed and positioning of a carrier or carrying bottom is possible.

As soon as a first layer (10) has been fully assembled on the carrier or carrying bottom, the carrier or carrying bottom may be lowered, for example, by the lifting device. An intermediate bottom may then be placed on the first layer (10), so that another layer can be formed above the first layer (10) in a next operation. The piece goods (2) may now be placed on the intermediate bottom row by row.

A supporting device (21), which is configured, for example, as an adjustable railing, is preferably formed in the holding area (9). The supporting device (21) may define one or more sides of the holding area (9), and especially all four sides, which are not oriented towards the goods aisle (8) or to the inflow area (E). The supporting device (21) may have a one-part or multipart configuration. As an alternative or in addition, a layer carrier, which brings about a support function of the above-mentioned type, may be arranged in the holding area (9). This may be, for example, a tray made of cardboard, metal or another suitable material. One, two or more upwardly directed walls, which form a limitation of the holding area (9), may be provided at the tray. Further, combinations of the above-mentioned configuration possibilities of a supporting device (21) are possible, for example, by providing a tray with low side walls for support in the lower area and by providing a railing for support in the upper area.

If the layer (10) to be formed in the holding area (9) is nested, i.e., it has rows (3, 4, 5) offset in relation to one another (cf. FIG. 2), only one of the two outer border bottles comes into contact in each row (4, 5) with the lateral supporting device (21), while a distance remains to the supporting device (21) at the pulled-in border bottle. One or more extensible holding devices, which bridge over the aforementioned distance and bring about a lateral support of the drawn-in border bottle, may be provided at the supporting device (21). These holding devices may be configured, for example, as movable pins.

The relocation guides (11-15) may be moved by any desired moving device according to the disclosed relocation process. In the example according to FIG. 1, the moving device is formed by an endless conveyor (18) and one or more lifting devices (19). The endless conveyor (18) is configured to move the relocation guides (11-15) in the horizontal direction from the goods aisle (8) to the holding area (9) and after the conclusion of a relocation operation back to the holding area (8). A first path of movement (16) is provided for the forward travel under the endless conveyor (18). A second path of movement (17) is provided for the return path above the endless conveyor (18). The first path of movement (16) extends at least from the inflow area (E) at the goods aisle (8) to the holding area (9).

The one or more lifting devices (19) are configured to arrange the relocation guides (11-15) in a feed movement oriented at right angles to the relocation movement at or above a row (3-7) of piece goods (2) and to remove them from the row (3-7) in the reverse direction. The lifting device (19) shown in FIG. 1 is only one possible embodiment variant for a feeding device for positioning a relocation guide at a row (3-7) or at a set of rows and for removing a relocation guide (11-15) from a row (3-7) or from a set or rows. As an alternative, the positioning and the removal of a relocation guide (11-15) may be effected by a feeding device of any other desired configuration.

A separate lifting device (19) is provided for each relocation guide (11-15) in the example according to FIG. 1, and the entirety of a lifting device (19) and a corresponding relocation guide (15) is moved by the endless conveyor (18). As an alternative, one or more separate feeding devices may be provided in the inflow area (E) and in the holding area (9) in order to transfer a relocation guide (11-15) between the first path of movement (16) and the second path of movement (17).

The endless conveyor (18) is arranged in the example according to FIG. 1 in the vertical direction above the range of movement for the relocation for the piece goods (2) and it extends especially in the horizontal direction at least from the inflow area (E) and the holding area (9). The relocation guides (11-15) are moved by the moving device, here the endless conveyor (18) and the lifting devices (19), i.e., in a horizontal plane and essentially at right angles to the longitudinal direction of the rows (3-7). Further, the relocation guides (11-15) are displaced on a path closed in a ring-shaped manner from the inflow area (E) along the first path of movement (16) to the holding area (9), then transferred at least along a first displacing movement to the second path of movement (17), moved back along the second path of movement (17) to the inflow area (E) and transferred there at least along a second displacing movement to the first path of movement (16) and positioned in the inflow area (E).

According to an alternative embodiment variant (not shown), an endless conveyor may be arranged in the longitudinal direction of the rows (3-7) in front of or behind the movement area. A feeding device can displace in such a case a relocation guides (11-15) in the longitudinal direction of a row (3-7) in order to position the relocation guide in the inflow area and to pull it off again from a row (3-7) in the opposite direction.

According to another alternative, a feeding device may be configured to position a relocation guide (11-15) by a tilting or pivoting movement in a plane oriented essentially horizontally and parallel to the longitudinal direction of a row (3-7) and especially to pivot it over the respective row (3-7) and optionally to remove it again in the opposite direction.

It is common to the aforementioned embodiment variants and other possible embodiment variants of the use of the relocation process according to the disclosure that a relocation guide (11-15) is relocated with at least one picked-up row (3-7) along a first path of movement (16) between the goods aisle (8) and the holding area (9), while an empty relocation guide (3-7) is moved back on a second path of movement (17), the second path of movement (17) being offset at right angles in relation to the first path of movement (16).

FIGS. 3 through 6 explain the relocation process according to the present invention analogously to the example according to FIG. 1 in a lateral view. The first path of movement (16) extends in an essentially horizontal direction between the inflow area (E) or the goods aisle (8) and the holding area (9). The second path of movement (17) is arranged above the first path of movement (16) and is arranged offset by at least the height of a relocation guide (13). In other words, the second path of movement (17) is offset in the horizontal direction and at right angles to the first path of movement (16).

According to the above explanations, the person skilled in the art will recognize that the second path of movement (17) may alternatively be offset in the vertical direction and at right angles to the first path of movement (16). Likewise alternatively, any desired other offset arrangement of the first path of movement (16) and of the second path of movement (17) is possible, which makes it possible for a return movement of relocation guides (11-15) along the second path of movement (17) not to hinder the relocating movement along the first path of movement (16) for assembling or disassembling a row.

FIG. 3 shows a state during a relocation operation, during which a first row (3) has been arranged in a holding area (9) by a first relocation guide (11). A second row (4) is guided by a second relocation guide (12) along the first path of movement (16) to the holding area (9) and shall be arranged there next to the first row (3). In the state according to FIG. 3, the first row (3) presently forms the single and hence outermost row (K1) of the layer (10). As soon as the second row (4) is arranged next to the first row (3) according to the state shown in FIG. 4, the first row (3) becomes the second-outermost row (K2) and the second row (4) becomes the outermost row (K1), etc.

As can be seen from the transition from FIG. 3 to FIG. 4, the first relocation guide (11) is left at the first added row (3) until the second relocation guide (12) adds or has added the next row (4) at the layer (10) to be assembled. The first relocation guide (11) is removed from the first row (3), i.e., from the now second-outermost row (K2) and is displaced in the direction of the second path of movement (17) only when the second row (4) secures the first row (3) against falling over according to the state shown in FIG. 4 and is arranged especially in the desired position within the layer (10). According to a first embodiment variant, the removal of the first relocation guide (11) can consequently begin only when the positioning of the second relocation guide (21) with the next row (4) has been concluded in the desired position, so that a separation is provided in time between the removing movement of the first relocation guide and the positioning movement of the second relocation guide. As an alternative, an overlap in time may be provided between the beginning of the removing movement of the first relocation guide and the positioning movement of the second relocation guide if supporting of the respective outermost row of the layer against falling over is guaranteed.

A third row (5) (or another set of rows) was preferably formed in the inflow area (E) or at the goods aisle (8) preferably simultaneously with the above-described movements of the first and second relocation guides (11, 12) in the example according to FIGS. 3 and 4. The formation of the row is carried out at least partially before a relocation guide, here the third relocation guide (13) is positioned at the inflow area (E) in the example being shown here. In other words, the row is formed partially in the absence of a relocation guide in the inflow area (E). As an alternative, a relocation guide may be positioned in the inflow area (E) during the entire duration of a row formation.

In the example according to FIG. 3, the third relocation guide (13) is just being fed to the inflow area (E). The feed movement is represented as a vertical lowering movement, which takes place in a vertical plane above the inflow area (E). The third relocation guide (13) is now displaced from the second path of movement (17) to the first path of movement. This displacement may be brought about by the aforementioned lifting device (19) or any other feeding device. The fully formed third row (5) is transported to the holding area (9) according to the relocating operation shown in FIGS. 4 through 6 by a movement of the relocation guide (13) along the first path of movement (16). In the state according to FIG. 5, the third relocation guide (13) is still on its way between the goods aisle (8) and the intended holding location in the holding area (9). The first relocation guide (11) has already been displaced by this time to the second path of movement (17) and can be moved back in the direction of the inflow area (E) or the goods aisle (8) along the second path of movement (17). In the state according to FIG. 6, the third row (5) has been arranged next to the first row (3) and the second row (4) in the layer (10). The third row (5) thus forms the outermost row (K1) now and the second row (4) forms the second-outermost row (K2). As soon as the addition of the third row (5) or outermost row (K1) has been concluded, or has especially been concluded to the extent that the third relocation guide (13) can also support all the rows (3, 4) already present in the layer (10) and can secure them against falling over, the second relocation guide (12) can be pulled off from the second row (4). It is now likewise displaced by a feeding device from the first path of movement (16) to the second path of movement (17). The operation shown in FIGS. 3 through 6 is subsequently repeated for as many additional rows (7) or sets of rows as desired, until the layer (10) has been fully assembled.

An operation for assembling a layer was explained with reference to FIGS. 3 through 6. The movements shown in FIGS. 3 through 6 may be carried out in the reverse order and direction for disassembling a layer.

If, for example, the third row (5), which is presently the outermost row (K1) of the layer (10) according to FIG. 6, shall be removed from the layer (10) by the third relocation guide (13), an additional relocation guide—analogous to the relocation guide (12) in FIG. 6—is positioned prior to the removal of this outermost row (K1) above the second-outermost row (K2), here the second row (4), in order to secure this against falling over. This additional relocation guide (12) also now supports (indirectly) the other rows (3) in the layer (10). The outermost row (K1) is removed from the layer (10) only when the additional relocation guide (12) is arranged in the intended securing position above the second-outermost row (K2) (cf. FIG. 5 with reversal of the directions of movement shown).

According to the transition from FIG. 5 to FIG. 4, the first relocation guide (11) would be positioned at the first row (3)

during the further course of the disassembly of the row before the second relocation guide (12) removes the second row (4).

The rows (3-7) may be arranged in the layer (10) essentially uniformly next to one another, i.e., in an orthogonal grid (cf. FIG. 1). As an alternative, an offset may be provided between the rows (3-7). The offset may preferably be uniform and recurring. For example, FIG. 2 shows a pattern of arrangement in which every other row is arranged offset in relation to every first row by about half the width of the bottle. The packing density can be increased by the pattern of arrangement according to FIG. 2 in case of round piece goods. Correspondingly different patterns of arrangement may be provided for other cross-sectional shapes of piece goods (2).

The formation of the offset between the rows (3-7) may be formed in any desired manner during the assembly of the layer and/or disassembled during the disassembly of the layer. According to a first embodiment variant, the above-mentioned stop, which limits the inflow of the bottles (2) in the inflow area (E), may be movable in the longitudinal direction of a row (3-7). The stop may be set for every first row in a first position and for every other row of bottles in a second position, which is displaced, for example, by half the width of a bottle in the longitudinal direction in relation to the first position. In other words, an offset can be formed by a displaceable stop in the inflow area (E) or at the goods aisle (8). As an alternative or in addition, a relocation guide (11-15) may perform a displacing movement in the longitudinal direction of the rows (3-7) superimposed to the relocating movement in the longitudinal direction of the rows (3-7). In other words, the transport device may be configured to form an offset by a movement of a relocation guide (11-15) in the longitudinal direction of the rows (3-7). The relocation guide may now guide the picked-up row by any device, for example, at the end faces of the row.

Further, two or more rows (3-7) may be lined up on parallel tracks of the goods aisle (8) with an offset. The two or more rows (3-7) can then be relocated to the holding area (9) as a block by one relocation guide or by a plurality of relocation guides while maintaining the offset.

A single row (3-7) is picked up by a relocation guide (11-15) each in the examples shown. The relocation guide (11-15) now guides the respective row (3-7) on the longitudinal sides of the row only. In addition, guiding of the picked-up row on one end face or on both end faces may be provided. As an alternative or in addition, a relocation guide may be configured to grasp the piece goods (2) of a row (3-7) to be picked up. Lifting of a row (3-7) by a relocation guide (11-15) may be provided in such a case, whereby rapid acceleration and deceleration at the beginning and at the end of the relocating movement as well as accurate positioning of the row at the intended holding location are facilitated. Especially in case of bottles, a projecting collar under the screw cap may be grasped by one or more gripping devices on a relocation guide.

A relocation guide (11, 12, 13, 14) was fed at the inflow area (E) in the vertical direction in the examples according to FIGS. 3 through 6. As an alternative, a relocation guide may be displaced on the outer side next to the inflow area (E) in the vertical direction from the second path of movement (17) to the first path of movement (16). In other words, a waiting position may be provided for a next relocation guide (12, 13, 14) on the outer side next to the inflow area (E). While a first relocation guide is being filled in the inflow area (E) with a row, a next relocation guide can already be brought into the waiting position. As soon as the filling of the first relocation guide has been concluded, this can be moved at the same time with the next relocation guide in the direction of the holding area (9), so that the next relocation guide is positioned directly thereafter above the inflow area (E) in order to be filled with the next piece goods. An especially short cycle time is thus achieved. The waiting position may thus be part of the first path of movement (16), which will then extend beyond the inflow area (E) to the outside.

The transport device (1) is preferably adaptable to piece goods (2) of different dimensions. In particular, the relocation guides (11-15) may be adaptable to a width and/or height of the piece goods (2). Further, the transport device (1) is adapted for the movement of rows (3-7) having uniform or different piece counts. A relocation guide (11-15) may accordingly be adapted to the length or the piece count of a row (3-7) or of a set of rows.

Various variants of the present invention are possible. In particular, the features shown, described, claimed or otherwise disclosed in connection with the exemplary embodiments may be combined with one another, replaced with one another, complemented or omitted as desired.

One or more relocation guides (11-15), which had already picked up a row (2-7) or a set of rows, may be buffered during a changing of layers in the holding area (9) in an area between the inflow area (E) and the holding area (9). A changing of the layer or a change of the carrier can be prevented in this manner from leading to stopping of the feed or removal of piece goods (2) in the inflow area.

The holding strips (22) of a relocation guide (11-15) may optionally be arranged in a height-adjustable manner. They may be able, in particular, to be moved individually or together. Instead of a holding strip (22), any other desired longitudinal guiding device may be provided. If a relocation guide (11-15) is arranged for securing a second-outermost row (K2), the holding strip (22), which points away from the inflow area or which is arranged towards the core of the layer (10) inwardly, may optionally be removed before the relocation guide and the outer holding strip (22) are removed.

When a first relocation guide (11) has been removed during the assembly of a layer after the addition of the next row (K1) by another relocation guide (12), the additional relocation guide (12) may optionally be moved once again somewhat in the relocation direction, i.e., towards the inner side of the layer (10). The spaces that have been left free in the layer (10) after the removal of the first relocation guide can be closed by this additional movement by compaction. In other words, compaction of the layer (10) can be brought about by the additional movement.

FIG. 7 shows different embodiment alternatives for the examples explained above. The features explained below may be used in themselves or in any desired combination with the features of the above-mentioned examples.

While the endless conveyor (18) shown in FIG. 1 is configured as a belt conveyor or chain conveyor, FIG. 7 shows an endless conveyor (18) with at least two rotary carriers (25). The rotary carriers are mounted rotatably in relation to a common axis (28) and can be driven individually. Each rotary carrier has two carrying arms, which carry a lifting device (19) each at their respective ends. As an alternative, each rotary carrier may have only one or more carrying arms.

A flat surface, e.g., a sliding surface or a sliding table, via which the rows (3, 4, 5) are moved by the relocation guides (11, 12, 13), are arranged between the inflow area at the goods aisle (8) in the above-mentioned examples. This flat surface possibly brings about a support in the vertical direction for the rows (3, 4, 5). According to the embodiment shown in FIG. 7, a linear conveyor (24) may be arranged, e.g., in the form of a driven or driveless conveyor belt, between the inflow area at the goods aisle (8) and the holding area (9). The relocating movement may be actively supported by the linear conveyor (24) between the inflow area (E) and the holding area (9), so that only a part of the force necessary for the relocation is to be applied by the relocation guides (11, 12, 13). As an alternative, the linear conveyor may be provided without a drive and support the relocating movement by reducing the kinetic resistance.

While the holding area (9) is formed by a surface not movable in the horizontal direction in the above-mentioned example, FIG. 7 shows an alternative embodiment. The holding area (9') is formed here by another linear conveyor, especially a conveyor belt section. This linear conveyor can be moved farther successively with each newly placed row (3, 4, 5). On the side pointing away from the inflow area (E), a movable supporting device may be arranged, which is likewise moved successively with the layer (10) formed. A slide (23), which supports the first row (3) of the layer (10) until it is finished, is provided for this in the example according to FIG. 7.

A lifting device (19) for lifting or lowering a relocation guide (11, 12, 13) may be formed according to the example shown in FIG. 7 as an adjusting cylinder or as a chain thrust drive. The lifting device (19) may act in one direction according to a first embodiment variant and only raise a relocation guide (11, 12, 13) actively, while the lowering is brought about, for example, by the weight. As an alternative, a lifting device (19) may act in both directions for actively lifting and lowering a relocation guide (11, 12, 13).

While specific embodiments of the invention have been shown and described in detail to illustrate the application of the principles of the invention, it will be understood that the invention may be embodied otherwise without departing from such principles.

The invention claimed is:

1. A transport device for the row-by-row relocation of piece goods prone to falling over, between an inflow area, at which the piece goods arrive or leave in an essentially horizontal direction of movement, and a holding area for a layer of rows of piece goods arranged next to each other, the transport device comprising:
   a plurality of relocation guides movable in a controlled manner, which are configured to transport a row or a set of rows of piece goods between the inflow area and the holding area in order to assemble or disassemble a layer; and
   the transport device is configured to secure a second-outermost row or a second-outermost set of rows of the layer against falling over by means of one of the relocation guides during the assembly of a layer or the disassembly of a layer, while an outermost row or an outermost set of rows is added at the layer or is removed from the layer with one or more other relocation guides of the plurality of relocation guides.

2. A transport device in accordance with claim 1, wherein the transport device is configured to leave said one of the relocation guides comprising a first relocation guide, of the plurality of relocation guides, at an added row or at an added set of rows of the layer while assembling a layer until the one or more other relocation guides, of the plurality of relocation guides, has added the next row or the next set of rows to the layer and/or until the additional relocation guide supports the row added by the first relocation guide against falling over.

3. A transport device in accordance with claim 1, wherein the transport device is configured to move said one of the relocation guides to the second-outermost row or a second-outermost set of rows of the layer during the disassembly of a layer before said one or more other of the plurality of relocation guides, comprised by a first relocation guide, of the plurality of relocation guides, removes the outermost row or the outermost set of rows of the layer.

4. A transport device in accordance with claim 1, wherein:
   the inflow area is associated with a goods aisle with which piece goods are guided along the goods aisle to the transport device and enter the inflow area of the transport device; and
   the transport device is configured to move a relocation guide, of the plurality of relocation guides, with at least one picked-up row along a first path of movement between the goods aisle and the holding area and to move an empty relocation guide back on a second path of movement, wherein the second path of movement is offset in relation to the first path of movement at right angles to the relocation direction.

5. A transport device in accordance with claim 4, wherein the second path of movement is offset in the horizontal direction at right angles to the first path of movement.

6. A transport device in accordance with claim 4, wherein the second path of movement is offset in the vertical direction at right angles to the first path of movement.

7. A transport device in accordance with claim 1, further comprising an endless conveyor for moving the relocation guides in a ring.

8. A transport device in accordance with claim 7, further comprising a lifting device at the endless conveyor for lifting or lowering a relocation guide from or over a row.

9. A transport device in accordance with claim 1, wherein at least one relocation guide, of the plurality of relocation guides, is configured to grasp the piece goods of a row to be picked up.

10. A transport device in accordance with claim 1, wherein at least one relocation guide, of the plurality of relocation guides, is adaptable to a width and/or a height of the piece goods.

11. A transport device in accordance with claim 1, wherein at least one relocation guide, of the plurality of relocation guides, can be adapted to the length of a row or of a set of rows.

12. A transport device in accordance with claim 1, wherein the transport device is configured to add or remove rows at the layer with an offset in the longitudinal direction of the rows.

13. A transport device in accordance with claim 7, wherein the endless conveyor is configured as a belt conveyor or chain conveyor or as a rotary carrier.

14. A transport device in accordance with claim 1, further comprising a lifting device configured as an adjusting cylinder or as a chain thrust drive.

15. A transport device in accordance with claim 1, wherein the transport device is configured to:
   leave said one of the relocation guides comprising a first relocation guide, of the plurality of relocation guides, at an added row or at an added set of rows of the layer while assembling a layer until the one or more other relocation guide, of the plurality of relocation guides, has added the next row or the next set of rows to the layer and/or until the additional relocation guide, of the plurality of relocation guides, supports the row added by the first relocation guide against falling over; and/or move said one of the relocation guides to the second-outermost row or a second-outermost set of rows of the layer during the disassembly of a layer before said one or more other of the plurality of relocation guides comprised by a first relocation guide, of the plurality of relocation guides, removes the outermost row or the outermost set of rows of the layer.

16. A relocation process for the row-by-row relocation of piece goods, prone to falling over between an inflow area, at which the piece goods enter or leave in an essentially horizontal direction of movement, and a holding area for a layer of rows of piece goods arranged next to each other, the process comprising the steps of:

provided movable relocation guides;

transporting a respective row or a respective set of rows of piece goods between the inflow area and the holding area in order to assemble or disassemble a layer; and securing a second-outermost row or a second-outermost set of rows of the layer during the assembly or disassembly of a layer by means of one of the relocation guides against falling over, while an outermost row or the outermost set of rows is being added to the layer or is being removed from the layer with one or more other of the plurality of relocation guides.

17. A relocation process in accordance with claim 16, wherein said one of the relocation guides comprises a first relocation guide, of the plurality of relocation guides, that is left during the assembly of the layer at an added row or at an added set of rows of the layer until another relocation guide, as said one or more other of the plurality of relocation guides, has added the next row or the next set of rows to the layer and/or until the another relocation guide, of the plurality of relocation guides, supports the row added by the first relocation guide against falling over.

18. A relocation process in accordance with claim 16, wherein said one of the relocation guides is moved to the second-outermost row or to a second-outermost set of rows of the layer during the disassembly of a layer before a first relocation guide, as said one or more other of the plurality of relocation guides, disassembles the outermost row or the outermost set of rows of the layer.

19. A relocation process in accordance with claim 16, wherein:

the inflow area is associated with a goods aisle with which piece goods are guided along the goods aisle to the transport device and enter the inflow area of the transport device; and a relocation guide, of the plurality of relocation guides, with at least one picked-up row is moved along a first path of movement between the goods aisle and the holding area and an empty relocation guide is moved back on a second path of movement, wherein the second path of movement is offset at right angles to the relocation direction in relation to the first path of movement.

20. A transport device for the row-by-row relocation of piece goods prone to falling over, between an inflow area, at which the piece goods arrive or leave in an essentially horizontal direction of movement, and a holding area for a layer of rows of piece goods arranged next to each other, the transport device comprising:

a plurality of relocation guides movable in a controlled manner, which are configured to transport a row or a set of rows of piece goods between the inflow area and the holding area in order to assemble or disassemble a layer; and the transport device is configured to secure a second-outermost row or a second-outermost set of rows of the layer against falling over by means of one of the relocation guides during the assembly of a layer or the disassembly of a layer, while an outermost row or an outermost set of rows is added at the layer or is removed from the layer, wherein the transport device is configured to leave one of the relocation guides at an added row or at an added set of rows of the layer while assembling a layer until another relocation guide of the plurality of relocation guides has added the next row or the next set of rows to the layer and/or until the another relocation guide of the plurality of relocation guides supports the row added by the first relocation guide against falling over.

\* \* \* \* \*